US012749183B2

(12) United States Patent
Trintchouk

(10) Patent No.: US 12,749,183 B2
(45) Date of Patent: Sep. 29, 2026

(54) IMAGING SYSTEMS AND METHODS USEFUL FOR SIGNAL EXTRACTION

(71) Applicant: Singular Genomics Systems, Inc., San Diego, CA (US)

(72) Inventor: Fedor Trintchouk, San Diego, CA (US)

(73) Assignee: Singular Genomics Systems, Inc., San Diego, CA (US)

( * ) Notice: Subject to any disclaimer, the term of this patent is extended or adjusted under 35 U.S.C. 154(b) by 394 days.

(21) Appl. No.: 18/363,611

(22) Filed: Aug. 1, 2023

(65) Prior Publication Data

US 2024/0037742 A1 Feb. 1, 2024

Related U.S. Application Data

(60) Provisional application No. 63/394,244, filed on Aug. 1, 2022.

(51) Int. Cl.

| | |
|---|---|
| ***G06T 7/00*** | (2017.01) |
| ***G06T 5/70*** | (2024.01) |
| ***G06T 7/11*** | (2017.01) |

(52) U.S. Cl.

CPC .............. *G06T 7/0012* (2013.01); *G06T 5/70* (2024.01); *G06T 7/11* (2017.01); *G06T 2207/10024* (2013.01); *G06T 2207/10064* (2013.01); *G06T 2207/20021* (2013.01); *G06T 2207/30024* (2013.01); *G06T 2207/30072* (2013.01)

(58) Field of Classification Search

CPC . G06T 7/0012; G06T 5/70; G06T 7/11; G06T 2207/10024; G06T 2207/10064; G06T 2207/20021; G06T 2207/30024; G06T 2207/30072

See application file for complete search history.

(56) References Cited

U.S. PATENT DOCUMENTS

| | | | | |
|---|---|---|---|---|
| 5,659,318 | A * | 8/1997 | Madsen | G01S 13/9023 342/156 |
| 7,829,162 | B2 | 11/2010 | Eskra et al. | |
| 10,100,347 | B2 | 10/2018 | Otwinowski et al. | |
| 11,308,640 | B2 | 4/2022 | Vieceli et al. | |
| 11,900,595 | B2 | 2/2024 | Trintchouk et al. | |
| 12,099,175 | B2 | 9/2024 | Visscher et al. | |
| 2007/0170917 | A1 * | 7/2007 | Thompson | G01R 33/5616 324/318 |
| 2011/0242478 | A1 * | 10/2011 | Yakushiji | G03B 11/00 349/193 |
| 2013/0261027 | A1 | 10/2013 | Li et al. | |
| 2015/0069268 | A1 | 3/2015 | Schoenborn et al. | |

(Continued)

FOREIGN PATENT DOCUMENTS

WO WO-2022/269033 A1 12/2022

OTHER PUBLICATIONS

Bentley, D. R. et al. (Nov. 6, 2008). "Accurate whole human genome sequencing using reversible terminator chemistry," *Nature* 456(7218): 53-59.

(Continued)

*Primary Examiner* — Juan M Guillermety

(74) *Attorney, Agent, or Firm* — Mintz, Levin, Cohn, Ferris, Glovsky and Popeo, P.C.; Zachary L. Terranova

(57) ABSTRACT

Disclosed herein, inter alia, are methods and systems of image analysis useful for identifying and/or quantifying features in patterns.

29 Claims, 8 Drawing Sheets

(56) References Cited

U.S. PATENT DOCUMENTS

| | | | | |
|---|---|---|---|---|
| 2015/0206315 | A1* | 7/2015 | Price | G06T 7/11 382/180 |
| 2016/0032380 | A1 | 2/2016 | Craighead et al. | |
| 2016/0117571 | A1* | 4/2016 | Othmezouri | G06T 7/60 382/218 |
| 2017/0167979 | A1 | 6/2017 | Rulison et al. | |
| 2017/0349939 | A1 | 12/2017 | Metzker et al. | |
| 2019/0385307 | A1* | 12/2019 | Yaqub | G06T 7/0014 |
| 2020/0005437 | A1* | 1/2020 | Murase | G06T 5/73 |
| 2021/0114029 | A1 | 4/2021 | Yellen et al. | |
| 2021/0350533 | A1 | 11/2021 | Trintchouk et al. | |
| 2023/0281758 | A1* | 9/2023 | Rotscholl | G06T 5/70 382/264 |
| 2024/0037744 | A1 | 2/2024 | Trintchouk et al. | |
| 2025/0148603 | A1 | 5/2025 | Garcia et al. | |

OTHER PUBLICATIONS

Lyons, R. G. et al. (Mar. 4, 2015). "Estimating synchronization signal phase," *Media Watermarking, Security, and Forensics* 9409P, 15 pages. https://doi.org/10.1117/12.2083390.

Quinn, B. G. (May 1994). "Estimating frequency by interpolation using Fourier coefficients," *IEEE transactions on Signal Processing* 42(5): 1264-1268.

Perner, P. (2017) "Fluorescence Pattern Analysis How To Achieve a Better Quality-Standard", Current Trends in Biomedical Engineering & Biosciences 9(4): 77-80.

* cited by examiner

IMAGING SYSTEMS AND METHODS USEFUL FOR SIGNAL EXTRACTION

CROSS-REFERENCES TO RELATED APPLICATIONS

This application claims the benefit of U.S. Provisional Application No. 63/394,244 filed Aug. 1, 2022, which is incorporated herein by reference in its entirety and for all purposes.

BACKGROUND

Next generation sequencing (NGS) methods typically rely on the detection of genomic fragments immobilized on an array. For example, in sequencing-by-synthesis (SBS), fluorescently labeled nucleotides are added to an array of polynucleotide primers and are detected upon incorporation. The extension of the nucleic acid primer along a nucleic acid template is monitored to determine the sequence of nucleotides in the template. Each detection event, (i.e., a feature), can be distinguished due to their location in the array.

For these and other applications of polynucleotide arrays, improvements have recently been made to increase density of features in the arrays. Technological advances reduced the typical distance between neighboring features such that the features are only slightly larger than the optical resolution scale, the pixel pitch of the camera, or both. Often, there is significant spatial overlap of fluorescent signal between neighboring features that needs to be considered by the image analysis algorithm. As the size of the features decreases and the overall size of the arrays expand, accurate detection becomes problematic.

BRIEF SUMMARY

Disclosed herein, inter alia, are solutions to the aforementioned and other problems in the art. This disclosure provides methods and systems of image analysis useful for identifying and/or quantifying features in regular patterns. The systems and methods can be used, for example, to register multiple images of a regular pattern of features. In a non-limiting example, the systems and methods are configured to register multiple images of patterns that result from images of arrays used for nucleic acid sequencing.

In an aspect, there is provided a method of quantifying features in a repeating pattern (e.g., repeating features as in an array). In a non-limiting example, the method includes the steps of: obtaining a plurality images of an object using a detection apparatus, wherein the images includes a repeating pattern of features (e.g., repeating over the plurality) having different signal levels; providing the image or image-related data to a computer, wherein the computer has parameter data that describe the repeating pattern of features; partitioning the image or the image-related data into a plurality of registration subimages on the computer; detecting on the computer the repeating pattern of features for each registration subimage and assigning an index address for each feature of the repeating pattern of features; and quantifying a signal level of each feature. The method can further include a step of providing the object wherein the object has a repeating pattern of features in a two-dimensional plane, such as an xy plane. The method can further include a step of providing the object wherein the object has a repeating pattern of features in one or more two-dimensional planes, such as a z-stack of single two-dimensional xy planes. Moreover, one or more of the steps can be performed on the computer using an algorithm stored on computer-readable medium that causes the computer to perform one or more of the steps. In an example, the object is or relates to genomic fragments (e.g., polynucleotides) or fluorescently-labeled biomolecules immobilized on an array or in a cell sample.

Also provided is a system that includes a processor; a storage device; and a program including instructions for carrying out or otherwise performing the steps of the above method.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

FIG. 7A is the unwrapped phase angle for filter $f_0$, $f_1$, and $f_2$, respectively. FIG. 7B is the polynomial fit of the unwrapped phase, evaluated at every pixel of the original image for visualization purposes. FIG. 7C is the residual of the polynomial fit. The high spatial frequency features seen in the residual are smoothed out by the fit. They could not have resulted from physically feasible displacement (e.g. vibrations), and are likely noise resulting from the details of local distribution of beads or clusters.

DETAILED DESCRIPTION

I. Definitions

Figure 1:
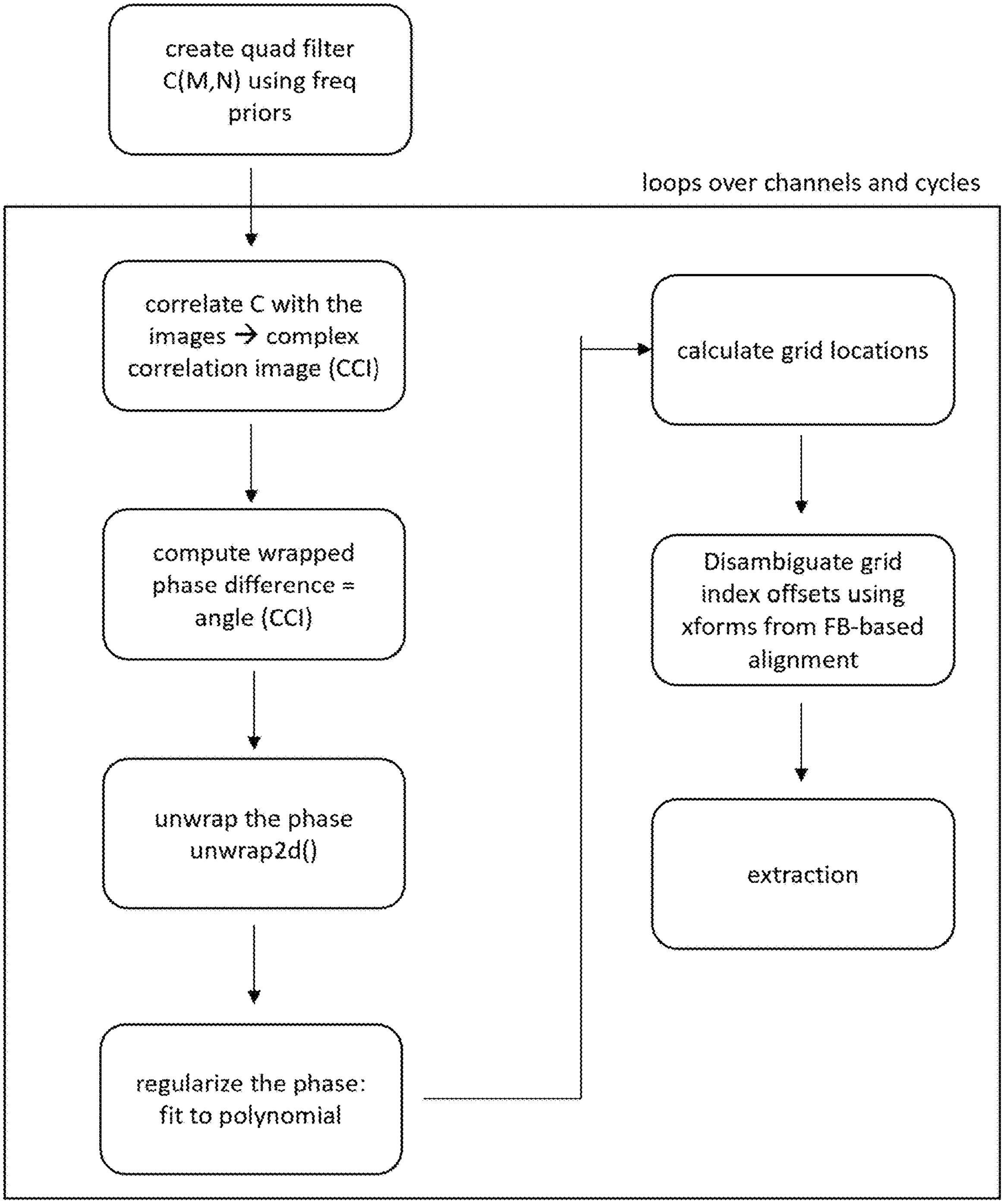
FIG. 1. General overview describing the protocol provided herein.

The practice of the technology described herein will employ, unless indicated specifically to the contrary, conventional methods of chemistry, biochemistry, organic chemistry, molecular biology, microbiology, recombinant DNA techniques, genetics, immunology, and cell biology that are within the skill of the art, many of which are described below for the purpose of illustration. Examples of such techniques are available in the literature. See, e.g., Singleton et al., DICTIONARY OF MICROBIOLOGY AND MOLECULAR BIOLOGY 2nd ed., J. Wiley & Sons (New York, NY 1994); and Sambrook and Green, Molecular Cloning: A Laboratory Manual, 4th Edition (2012). Methods, devices and materials similar or equivalent to those described herein can be used in the practice of this invention.

All patents, patent applications, articles and publications mentioned herein, both supra and infra, are hereby expressly incorporated herein by reference in their entireties.

Unless defined otherwise herein, all technical and scientific terms used herein have the same meaning as commonly understood by one of ordinary skill in the art to which this disclosure belongs. Various scientific dictionaries that include the terms included herein are well known and available to those in the art. Although any methods and materials similar or equivalent to those described herein find use in the practice or testing of the disclosure, some preferred methods and materials are described. Accordingly, the terms defined immediately below are more fully described by reference to the specification as a whole. It is to be understood that this disclosure is not limited to the particular methodology, protocols, and reagents described, as these may vary, depending upon the context in which they are used by those of skill in the art. The following definitions are provided to facilitate understanding of certain terms used frequently herein and are not meant to limit the scope of the present disclosure.

As used herein, the singular terms "a", "an", and "the" include the plural reference unless the context clearly indicates otherwise.

Reference throughout this specification to, for example, "one embodiment", "an embodiment", "another embodiment", "a particular embodiment", "a related embodiment", "a certain embodiment", "an additional embodiment", or "a further embodiment" or combinations thereof means that a particular feature, structure or characteristic described in connection with the embodiment is included in at least one embodiment of the present disclosure. Thus, the appearances of the foregoing phrases in various places throughout this specification are not necessarily all referring to the same embodiment. Furthermore, the particular features, structures, or characteristics may be combined in any suitable manner in one or more embodiments.

As used herein, the term "about" means a range of values including the specified value, which a person of ordinary skill in the art would consider reasonably similar to the specified value. In embodiments, the term "about" means within a standard deviation using measurements generally acceptable in the art. In embodiments, about means a range extending to +/−10% of the specified value. In embodiments, about means the specified value.

Throughout this specification, unless the context requires otherwise, the words "comprise", "comprises" and "comprising" will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that no other elements are optional and may or may not be present depending upon whether or not they affect the activity or action of the listed elements.

As used herein, the term "associated" or "associated with" can mean that two or more species are identifiable as being co-located at a point in time. An association can mean that two or more species are or were within a similar container. An association can be an informatics association, where for example digital information regarding two or more species is stored and can be used to determine that one or more of the species were co-located at a point in time. An association can also be a physical association. In some instances two or more associated species are "tethered", "coated", "attached", or "immobilized" to one another or to a common solid or semisolid support. An association may refer to covalent or non-covalent means for attaching labels to solid or semi-solid supports such as beads. In embodiments, primers on or bound to a solid support are covalently attached to the solid support. An association may comprise hybridization between a target and a label.

As used herein, the term "hybridize" or "specifically hybridize" refers to a process where two complementary nucleic acid strands anneal to each other under appropriately stringent conditions. Hybridizations are typically and preferably conducted with oligonucleotides. The terms "annealing" and "hybridization" are used interchangeably to mean the formation of a stable duplex. Non-limiting examples of nucleic acid hybridization techniques are described in, for example, Sambrook, et al., Molecular Cloning: A Laboratory Manual (2nd Edition, 1989).

As used herein, the term "nucleic acid" refers to nucleotides (e.g., deoxyribonucleotides or ribonucleotides) and polymers thereof in either single-, double- or multiple-stranded form, or complements thereof. The terms "polynucleotide," "oligonucleotide," "oligo" or the like refer, in the usual and customary sense, to a sequence of nucleotides. The term "nucleotide" refers, in the usual and customary sense, to a single unit of a polynucleotide, i.e., a monomer. Nucleotides can be ribonucleotides, deoxyribonucleotides, or modified versions thereof. Examples of polynucleotides contemplated herein include single and double stranded DNA, single and double stranded RNA, and hybrid molecules having mixtures of single and double stranded DNA and RNA with linear or circular framework. Non-limiting examples of polynucleotides include a gene, a gene fragment, an exon, an intron, intergenic DNA (including, without limitation, heterochromatic DNA), messenger RNA (mRNA), transfer RNA, ribosomal RNA, a ribozyme, cDNA, a recombinant polynucleotide, a branched polynucleotide, a plasmid, a vector, isolated DNA of a sequence, isolated RNA of a sequence, a nucleic acid probe, and a primer. Polynucleotides useful in the methods of the disclosure may comprise natural nucleic acid sequences and variants thereof, artificial nucleic acid sequences, or a combination of such sequences.

As used herein, the terms “polynucleotide primer” and “primer” refers to any polynucleotide molecule that may hybridize to a polynucleotide template, be bound by a polymerase, and be extended in a template-directed process for nucleic acid synthesis. The primer may be a separate polynucleotide from the polynucleotide template, or both may be portions of the same polynucleotide (e.g., as in a hairpin structure having a 3' end that is extended along another portion of the polynucleotide to extend a double-stranded portion of the hairpin). Primers (e.g., forward or reverse primers) may be attached to a solid support. A primer can be of any length depending on the particular technique it will be used for. For example, PCR primers are generally between 10 and 40 nucleotides in length. The length and complexity of the nucleic acid fixed onto the nucleic acid template may vary. One of skill can adjust these factors to provide optimum hybridization and signal production for a given hybridization procedure. The primer permits the addition of a nucleotide residue thereto, or oligonucleotide or polynucleotide synthesis therefrom, under suitable conditions. In an embodiment the primer is a DNA primer, i.e., a primer consisting of, or largely consisting of, deoxyribonucleotide residues.

As used herein, the term “template polynucleotide” refers to any polynucleotide molecule that may be bound by a polymerase and utilized as a template for nucleic acid synthesis. A template polynucleotide may be a target polynucleotide. In general, the term “target polynucleotide” refers to a nucleic acid molecule or polynucleotide in a starting population of nucleic acid molecules having a target sequence whose presence, amount, and/or nucleotide sequence, or changes in one or more of these, are desired to be determined. In general, the term “target sequence” refers to a nucleic acid sequence on a single strand of nucleic acid. The target sequence may be a portion of a gene, a regulatory sequence, genomic DNA, cDNA, RNA including mRNA, miRNA, rRNA, or others.

A polynucleotide is typically composed of a specific sequence of four nucleotide bases: adenine (A); cytosine (C); guanine (G); and thymine (T) (uracil (U) for thymine (T) when the polynucleotide is RNA). Thus, the term “polynucleotide sequence” is the alphabetical representation of a polynucleotide molecule; alternatively, the term may be applied to the polynucleotide molecule itself. This alphabetical representation can be input into databases in a computer having a central processing unit and used for bioinformatics applications such as functional genomics and homology searching. Polynucleotides may optionally include one or more non-standard nucleotide(s), nucleotide analog(s) and/or modified nucleotides.

As used herein, the term “modified nucleotide” refers to nucleotide modified in some manner. Typically, a nucleotide contains a single 5-carbon sugar moiety, a single nitrogenous base moiety and 1 to three phosphate moieties. In embodiments, a nucleotide can include a blocking moiety or a label moiety. A blocking moiety on a nucleotide prevents formation of a covalent bond between the 3' hydroxyl moiety of the nucleotide and the 5' phosphate of another nucleotide. A blocking moiety on a nucleotide can be reversible, whereby the blocking moiety can be removed or modified to allow the 3' hydroxyl to form a covalent bond with the 5' phosphate of another nucleotide. A blocking moiety can be effectively irreversible under particular conditions used in a method set forth herein. A label moiety of a nucleotide can be any moiety that allows the nucleotide to be detected, for example, using a spectroscopic method. Exemplary label moieties are fluorescent labels, mass labels, chemiluminescent labels, electrochemical labels, detectable labels and the like. One or more of the above moieties can be absent from a nucleotide used in the methods and compositions set forth herein. For example, a nucleotide can lack a label moiety or a blocking moiety or both.

As used herein, the term “label” or “labels” generally refer to molecules that can directly or indirectly produce or result in a detectable signal either by themselves or upon interaction with another molecule. Non-limiting examples of detectable labels include labels comprising fluorescent dyes, biotin, digoxin, haptens, and epitopes. In general, a dye is a molecule, compound, or substance that can provide an optically detectable signal, such as a colorimetric, luminescent, bioluminescent, chemiluminescent, phosphorescent, or fluorescent signal. In embodiments, the dye is a fluorescent dye. Non-limiting examples of dyes, some of which are commercially available, include CF dyes (Biotium, Inc.), Alexa Fluor dyes (Thermo Fisher), DyLight dyes (Thermo Fisher), Cy dyes (GE Healthscience), IRDyes (Li-Cor Biosciences, Inc.), and HiLyte dyes (Anaspec, Inc.).

As used herein, the terms “solid support” and “substrate” and “solid surface” refers to discrete solid or semi-solid surfaces to which a plurality of primers may be attached. A solid support may encompass any type of solid, porous, or hollow sphere, ball, cylinder, or other similar configuration composed of plastic, ceramic, metal, or polymeric material (e.g., hydrogel) onto which a nucleic acid may be immobilized (e.g., covalently or non-covalently). A solid support may comprise a discrete particle that may be spherical (e.g., microspheres) or have a non-spherical or irregular shape, such as cubic, cuboid, pyramidal, cylindrical, conical, oblong, or disc-shaped, and the like. A bead can be non-spherical in shape. A solid support may be used interchangeably with the term “bead.” A solid support may further comprise a polymer or hydrogel on the surface to which the primers are attached. Exemplary solid supports include, but are not limited to, glass and modified or functionalized glass, plastics (including acrylics, polystyrene and copolymers of styrene and other materials, polypropylene, polyethylene, polybutylene, polyurethanes, Teflon™, cyclic olefin copolymers, polyimides etc.), nylon, ceramics, resins, Zeonor, silica or silica-based materials including silicon and modified silicon, carbon, metals, inorganic glasses, optical fiber bundles, photopatternable dry film resists, UV-cured adhesives and polymers. Useful substrates include those that allow optical detection, for example, by being translucent to energy of a desired detection wavelength and/or do not produce appreciable background fluorescence at a particular detection wavelength. The solid supports for some embodiments have at least one surface located within a flow cell. The solid support, or regions thereof, can be substantially flat. The solid support can have surface features such as wells, pits, channels, ridges, raised regions, pegs, posts or the like. The term solid support is encompassing of a substrate (e.g., a flow cell) having a surface comprising a polymer coating covalently attached thereto. In embodiments, the solid support is a flow cell. The term “flowcell” as used herein refers to a chamber including a solid surface across which one or more fluid reagents can be flowed. Examples of flowcells and related fluidic systems and detection platforms that can be readily used in the methods of the present disclosure are described, for example, in Bentley et al., Nature 456:53-59 (2008).

The term “array” is used in accordance with its ordinary meaning in the art, and refers to a population of different molecules that are attached to one or more solid-phase substrates such that the different molecules can be differentiated from each other according to their relative location. An array can include different molecules that are each located at different addressable features on a solid-phase substrate. The molecules of the array can be nucleic acid primers, nucleic acid probes, nucleic acid templates or nucleic acid enzymes such as polymerases or ligases. Arrays useful in the invention can have densities that ranges from about 2 different features to many millions, billions or higher. The density of an array can be from 2 to as many as a billion or more different features per square cm. For example an array can have at least about 100 features/$cm^2$, at least about 1,000 features/$cm^2$, at least about 10,000 features/$cm^2$, at least about 100,000 features/$cm^2$, at least about 10,000,000 features/$cm^2$, at least about 100,000,000 features/$cm^2$, at least about 1,000,000,000 features/$cm^2$, at least about 2,000,000,000 features/$cm^2$ or higher. In embodiments, the arrays have features at any of a variety of densities including, for example, at least about 10 features/$cm^2$, 100 features/$cm^2$, 500 features/$cm^2$, 1,000 features/$cm^2$, 5,000 features/$cm^2$, 10,000 features/$cm^2$, 50,000 features/$cm^2$, 100,000 features/$cm^2$, 1,000,000 features/$cm^2$, 5,000,000 features/$cm^2$, or higher. In embodiments, the array is provided in a microplate. The term "microplate", as used herein, refers to a substrate comprising a surface, the surface including a plurality of reaction chambers separated from each other by interstitial regions on the surface. In embodiments, the microplate has dimensions as provided and described by American National Standards Institute (ANSI) and Society for Laboratory Automation And Screening (SLAS); for example the tolerances and dimensions set forth in ANSI SLAS 1-2004 (R2012); ANSI SLAS 2-2004 (R2012); ANSI SLAS 3-2004 (R2012); ANSI SLAS 4-2004 (R2012); and ANSI SLAS 6-2012, which are incorporated herein by reference. The dimensions of the microplate as described herein and the arrangement of the reaction chambers may be compatible with an established format for automated laboratory equipment. The reaction chambers may be provided as wells (alternatively referred to as reaction chambers), for example a microplate may contain 6, 12, 24, 48, 96, 384, or 1536 sample wells arranged in a 2:3 rectangular matrix. In embodiments, the reaction chamber is a microscope slide (e.g., a glass slide about 75 mm by about 25 mm). In embodiments the slide is a concavity slide (e.g., the slide includes a depression). In embodiments, the slide includes a coating for enhanced cell adhesion (e.g., poly-L-lysine, silanes, carbon nanotubes, polymers, epoxy resins, or gold). In embodiments, the microplate is about 5 inches by 3.33 inches, and includes a plurality of 5 mm diameter wells. In embodiments, the microplate is a flat glass or plastic tray in which an array of wells are formed, wherein each well can hold between from a few microliters to hundreds of microliters of fluid reagents and samples. The term "well" refers to a discrete concave feature in a substrate having a surface opening that is completely surrounded by interstitial region(s) of the surface. Wells can have any of a variety of shapes at their opening in a surface including but not limited to round, elliptical, square, polygonal, or star shaped (i.e., star shaped with any number of vertices). The cross section of a well taken orthogonally with the surface may be curved, square, polygonal, hyperbolic, conical, or angular. The wells of a microplate are available in different shapes, for example F-Bottom: flat bottom; C-Bottom: bottom with minimal rounded edges; V-Bottom: V-shaped bottom; or U-Bottom: U-shaped bottom. In embodiments, the well is square.

As used herein, the terms "cluster" and "colony" are used interchangeably to refer to a discrete site on a solid support that includes a plurality of immobilized polynucleotides and a plurality of immobilized complementary polynucleotides. The term "clustered array" refers to an array formed from such clusters or colonies. In this context the term "array" is not to be understood as requiring an ordered arrangement of clusters.

As used herein, the term "selective" or "selectivity" or the like of a compound refers to the compound's ability to discriminate between molecular targets.

The terms "bind" and "bound" as used herein are used in accordance with their plain and ordinary meanings and refer to an association between atoms or molecules. The association can be direct or indirect. For example, bound atoms or molecules may be directly bound to one another, e.g., by a covalent bond or non-covalent bond (e.g. electrostatic interactions (e.g. ionic bond, hydrogen bond, halogen bond), van der Waals interactions (e.g. dipole-dipole, dipole-induced dipole, London dispersion), ring stacking (pi effects), hydrophobic interactions and the like). As a further example, two molecules may be bound indirectly to one another by way of direct binding to one or more intermediate molecules (e.g., as in a substrate, bound to a first antibody, bound to an analyte, bound to a second antibody), thereby forming a complex. As used herein, the term "attached" refers to the state of two things being joined, fastened, adhered, connected or bound to each other. For example, a nucleic acid, can be attached to a material, such as a hydrogel, polymer, or solid support, by a covalent or non-covalent bond. In embodiments, attachment is a covalent attachment.

Where a range of values is provided, it is understood that each intervening value, to the tenth of the unit of the lower limit unless the context clearly indicates otherwise, between the upper and lower limit of that range, and any other stated or unstated intervening value in, or smaller range of values within, that stated range is encompassed within the invention. The upper and lower limits of any such smaller range (within a more broadly recited range) may independently be included in the smaller ranges, or as particular values themselves, and are also encompassed within the invention, subject to any specifically excluded limit in the stated range. Where the stated range includes one or both of the limits, ranges excluding either or both of those included limits are also included in the invention.

The terms "sequencing", "sequence determination", "determining a nucleotide sequence", and the like include determination of partial as well as full sequence information of the polynucleotide being sequenced. That is, the term includes sequence comparisons, fingerprinting, and like levels of information about a target polynucleotide, as well as the express identification and ordering of nucleotides in a target polynucleotide. The term also includes the determination of the identification, ordering, and locations of one, two, or three of the four types of nucleotides within a target polynucleotide. As used herein, the term "sequencing cycle" is used in accordance with its plain and ordinary meaning and refers to incorporating one or more nucleotides to the 3' end of a polynucleotide with a polymerase, and detecting one or more labels that identify the one or more nucleotides incorporated. The sequencing may be accomplished by, for example, sequencing by synthesis, pyrosequencing, and the like. In embodiments, a sequencing cycle includes extending a complementary polynucleotide by incorporating a first nucleotide using a polymerase, wherein the polynucleotide is hybridized to a template nucleic acid, detecting the first nucleotide, and identifying the first nucleotide. In embodiments, to begin a sequencing cycle, one or more differently labeled nucleotides and a DNA polymerase can be introduced. Following nucleotide addition, signals produced (e.g., via excitation and emission of a detectable label) can be detected to determine the identity of the incorporated nucleotide (based on the labels on the nucleotides). Reagents can then be added to remove the 3' reversible terminator and to remove labels from each incorporated base. Reagents, enzymes and other substances can be removed between steps by washing. Cycles may include repeating these steps, and the sequence of each cluster is read over the multiple repetitions.

As used herein, the term "feature" refers a point or area in a pattern that can be distinguished from other points or areas according to its relative location. An individual feature can include one or more polynucleotides. For example, a feature can include a single target nucleic acid molecule having a particular sequence or a feature can include several nucleic acid molecules having the same sequence (and/or complementary sequence, thereof). Different molecules that are at different features of a pattern can be differentiated from each other according to the locations of the features in the pattern. Non-limiting examples of features include wells in a substrate, particles (e.g., beads) in or on a substrate, polymers in or on a substrate, projections from a substrate, ridges on a substrate, or channels in a substrate. In embodiments, a feature refers to a location in an array where a particular species of molecule is present. A feature can contain only a single molecule or it can contain a population of several molecules of the same species. Features of an array are typically discrete. The discrete features can be contiguous or they can have spaces between each other. The size of the features and/or spacing between the features can vary such that arrays can be high density, medium density or lower density. High density arrays are characterized as having sites separated by less than about 15 μm (e.g., 3-6 μm). Medium density arrays have sites separated by about 15 to 30 μm. Low density arrays have sites separated by greater than 30 μm. An array useful herein can have, for example, sites that are separated by less than 10 μm, 5 μm, 1 μm, or 0.5 μm. An apparatus or method of the present disclosure can be used to detect an array at a resolution sufficient to distinguish sites at the above densities or density ranges.

In embodiments, the features have a mean or median separation from one another of about 0.5-5 μm. In embodiments, the mean or median separation is about 0.1-10 microns, 0.25-5 microns, 0.5-2 microns, 1 micron, or a number or a range between any two of these values. In embodiments, the mean or median separation is about or at least about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4., 4.5, 4.6, 4.7, 4.8, 4.9, 5.0 μm or a number or a range between any two of these values. In embodiments, the mean or median separation is about 0.1-10 microns. In embodiments, the mean or median separation is about 0.25-5 microns. In embodiments, the mean or median separation is about 0.5-2 microns.

In embodiments, the features have a mean or median diameter of about 100-2000 nm, or about 200-1000 nm. In embodiments, the mean or median diameter is about 100-3000 nanometers, about 500-2500 nanometers, about 1000-2000 nanometers, or a number or a range between any two of these values. In embodiments, the mean or median diameter is about or at most about 100, 200, 300, 400, 500, 600, 700, 800, 900, 1000, 1100, 1200, 1300, 1400, 1500, 1600, 1700, 1800, 1900, 2000 nanometers or a number or a range between any two of these values.

The distances between features can be described in any number of ways. In some embodiments, the distances between features can be described from the center of one feature to the center of another feature. In other embodiments, the distances can be described from the edge of one feature to the edge of another feature, or between the outer-most identifiable points of each feature. The edge of a feature can be described as the theoretical or actual physical boundary on a chip, or some point inside the boundary of the feature. In other embodiments, the distances can be described in relation to a fixed point on the object or in the image of the object.

The term "pitch," is used in accordance with its ordinary meaning when used in reference to features of an array, and refers to the spacing (e.g., center-to-center) for adjacent features. The term refers to spacing in the xy dimension. A pattern of features can be characterized in terms of average pitch. The pattern can be ordered such that the coefficient of variation around the average pitch is small or the pattern can be random in which case the coefficient of variation can be relatively large. In either case, the average pitch can be, for example, at least about 10 nm, about 0.1 μm, about 0.5 μm, about 1 μm, about 5 μm, about 10 μm, or more. In embodiments, the average pitch can be, about 10 μm, about 5 μm, about 1 μm, about 0.5 μm, about 0.1 μm or less. In embodiments, features are 450 nm in diameter with a pitch of 1.4 μm.

The term "image" is used according to its ordinary meaning and refers to a representation of all or part of an object. The representation may be an optically detected reproduction. For example, an image can be obtained from a detection apparatus configured to obtain fluorescent, luminescent, scatter, or absorption signals. The part of the object that is present in an image can be the surface or other xy plane of the object. Typically, an image is a 2 dimensional representation of a 3 dimensional object. An image may include signals at differing intensities (i.e., signal levels). An image can be provided in a computer readable format or medium.

As used herein, the term "signal" is intended to include, for example, fluorescent, luminescent, scatter, or absorption impulse or electromagnetic wave transmitted or received. Signals can be detected in the ultraviolet (UV) range (about 200 to 390 nm), visible (VIS) range (about 391 to 770 nm), infrared (IR) range (about 0.771 to 25 microns), or other range of the electromagnetic spectrum. The term "signal level" refers to an amount or quantity of detected energy or coded information. For example, a signal may be quantified by its intensity, wavelength, energy, frequency, power, luminance, or a combination thereof. Other signals can be quantified according to characteristics such as voltage, current, electric field strength, magnetic field strength, frequency, power, temperature, etc. Absence of signal is understood to be a signal level of zero or a signal level that is not meaningfully distinguished from noise.

The term "xy coordinates" refers to information that specifies location, size, shape, and/or orientation in an xy plane. The information can be, for example, numerical coordinates in a Cartesian system. The coordinates can be provided relative to one or both of the x and y axes or can be provided relative to another location in the xy plane (e.g., a fiducial). The term "xy plane" refers to a 2 dimensional area defined by straight line axes x and y. When used in reference to a detecting apparatus and an object observed by the detector, the xy plane may be specified as being orthogonal to the direction of observation between the detector and object being detected.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

II. Methods

The methods described herein can be used in conjunction with a variety of nucleic acid sequencing techniques. Particularly applicable techniques are those wherein nucleic acids are attached at fixed locations in an array such that their relative positions do not change and wherein the array is repeatedly imaged. Embodiments in which images are obtained in different color channels, for example, coinciding with different labels used to distinguish one nucleotide base type from another are particularly applicable. In some embodiments, the process to determine the nucleotide sequence of a target nucleic acid can be an automated process. Preferred embodiments include sequencing-by-synthesis ("SBS") and/or sequencing-by-binding ("SBB") techniques. SBS and SBB techniques generally involve the enzymatic extension of a nascent nucleic acid strand through the iterative addition of nucleotides against a template strand. SBS techniques can utilize nucleotides that have a label moiety or those that lack a label moiety. Accordingly, incorporation events can be detected based on a characteristic of the label, such as fluorescence of the label. In embodiments, where two or more different nucleotides are present in a sequencing reagent, the different nucleotides can be distinguishable from each other, or alternatively, the two or more different labels can be the indistinguishable under the detection techniques being used.

Image analysis algorithms or processes useful for extracting signals from randomly located points, such as fluorescent beads, generally include two steps: i) detecting the point locations, and ii) extracting the fluorescent intensities from those point locations. For example, a first feature may be detected at $(x_1, y_1, z_1)$ with a fluorescent intensity at that position, $I_1(x_1, y_1, z_1)$, while a second feature is detected at $(x_2, y_2, z_2)$ having fluorescent intensity, $I_2(x_2, y_2, z_2)$. This feature extraction typically works well under low density conditions, i.e., when there is significant distance between neighboring points. However, neither of the two steps account for the proximity of neighboring features. As the density of points of the image increases, the accuracy of such algorithms can degrade due to the spatial overlap of images. Such degradation tends to cause errors in both steps of the aforementioned algorithm.

Approaches to account for and potentially correct errors caused by overlapping images include introducing a point spread function (PSF), which serves to deconvolute the feature before the detection of the feature. The overlapping images and subsequent overlapping PSFs, can act to couple the location and intensities of the feature allowing for a joint solution for these quantities in each local neighborhood of the image. This can be done by, for example, minimizing the squared error between the image patch and its model over the space of candidate locations and intensities, where the model is constructed using an exemplar feature shape (e.g., a circle) and the PSF. However, this can significantly increase the computational load and may be more prone to introducing aberrations due to the technical complexity of implementing a PSF-corrected image.

A significant improvement may be achieved by arranging otherwise random distribution of features onto an ordered array (i.e., a pattern). For example, with the features arranged on a regular grid, there is no need to detect individual feature locations since the locations (x, y, z) are fixed and known. Note, the ordered pattern or ordered array does not necessarily need to be rectilinear (e.g., an x-y format of features that are in rows and columns), so long as the feature pattern and corresponding interstitial regions is known. The feature pattern is then registered with respect to a pixel grid. The pattern registration is described by a small number of parameters or parameter data, such as the grid orientation angle, the apparent pitch in pixel units, and the phase of the feature grid at some fixed pixel location. These parameters are determined from an average over features, so that even if the signal-to-noise ratio of an individual feature is low, accurate sub-pixel registration is possible. By knowing the pattern registration, it is then a matter to calculate the locations of all features, such that the only the intensities need to be determined, thereby reducing the number of variables threefold.

Many image and video processing applications benefit from evaluating local directional properties of images. Described herein is a different approach to grid mapping. The methods described herein do not necessarily rely on fast Fourier transforms (FFTs) and/or graph-based frequency and phase regularization. In image processing, when an image is convolved with a function, the function is called a filter, and its Fourier transform is called the frequency response of the filter. In contrast, the approach described herein utilizes correlations and phase unwrapping. By not relying on graph data structures simplifies programming since the correlations and phase unwrapping are array based calculations. Additionally, the phase-from-correlations approach described herein appears to be more robust to noise than phase-from-FFTs. There is less compute burden overall allowing this to be run on every channel for every cycle, and therefore taking account of transient distortions due to vibrations. A generalized flowchart for the approach may be found in FIG. 1.

Figure 2:
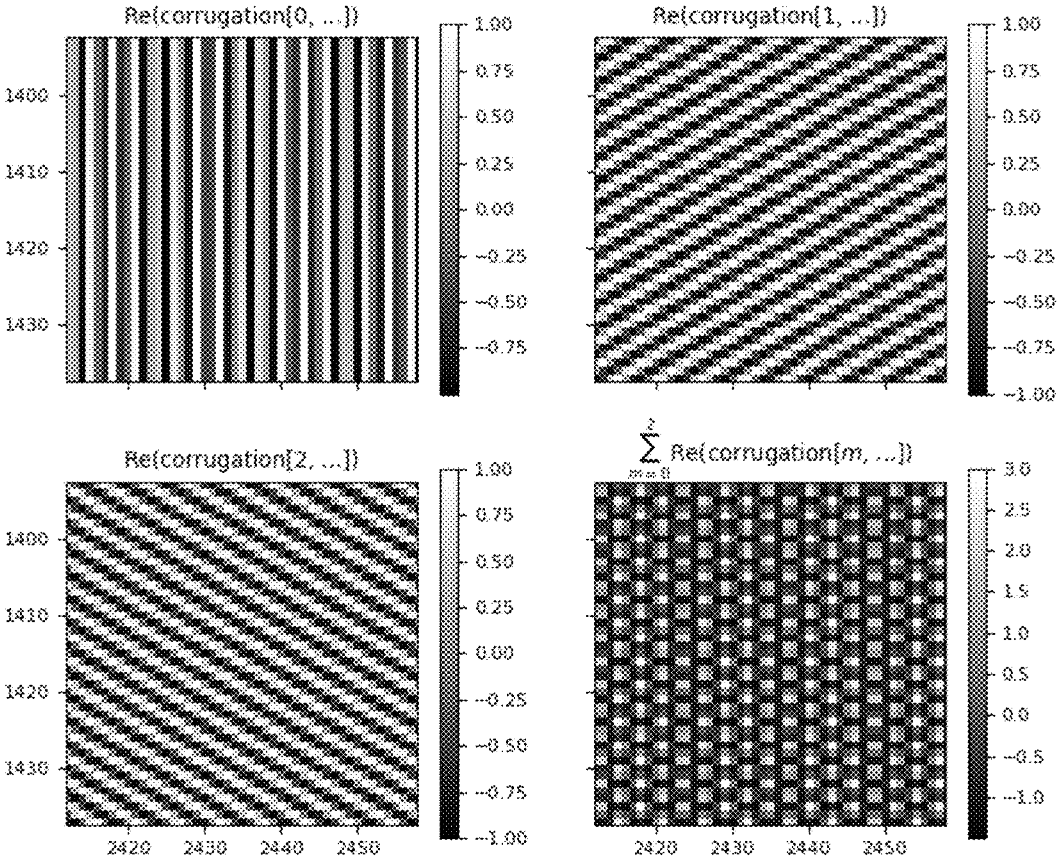
FIG. 2. Plots of the real part of the corrugation function. The top two and lower left panels are zoomed in view of each of the three components. The lower right is the sum of each of the three components.

Create or define a quadrature filter. For each of the three spatial frequencies describing a hex pattern, a corrugation image (also referred to herein as a quadrature filter) has the same dimension as the camera image, and complex data type: $C_m(x)=\exp^{(2\pi j\, f_m \cdot x+\Phi_m)}$m=0, 1, 2. The notion of quadrature filters is well-defined for 1 dimensional (1D) signals. Two 1D filters are in quadrature if they are Hilbert transforms of each other. One or more phase offsets are chosen such that each component of the corrugation is purely real and equal to 1 simultaneously at the points x corresponding to the idealized feature grid; see for example FIG. 2. In the simplest implementation, the "prior" nominal ideal frequencies are used to generate C, and distortion of any kind is ignored. The only inputs are the pattern pitch and orientation angle, pixel pitch and magnification, all at their nominal design values. The image can thus be generated once per the combination of flow cell (FC) type and instrument type.

Figure 3:
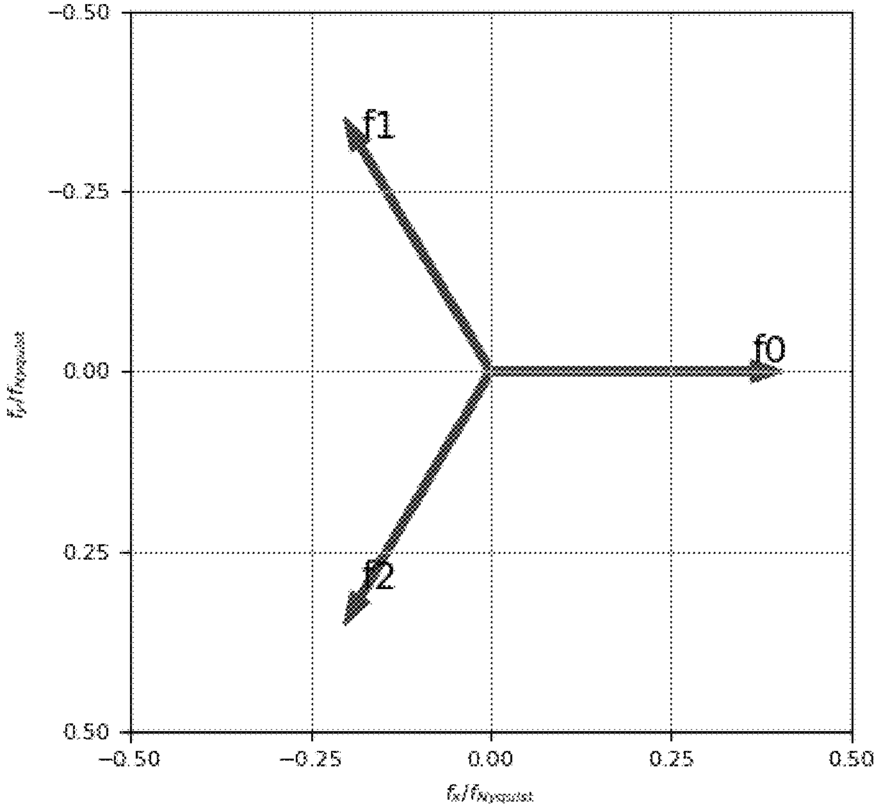
FIG. 3. The illustration of the notation/definition for the three pattern frequency vectors. Note that the vertical axis is inverted similar to the convention for the images. The magnitudes correspond to 1.0 micron pitch pattern imaged at 16X magnification with 5 micron size pixels.
Figure 4:
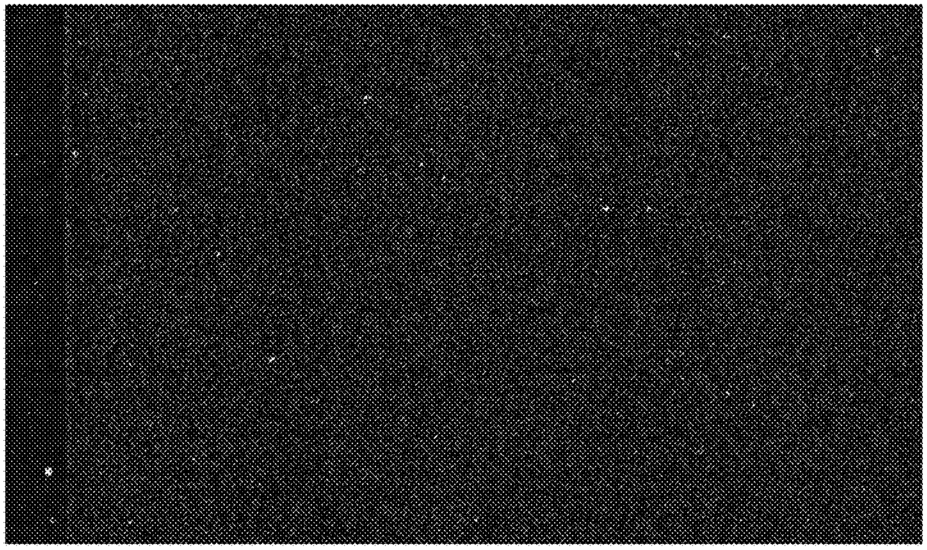
FIG. 4. Image of the a single channel from a sequencing run. Each dot is indicative of a “feature” or cluster of sequenced polynucleotides.
Figure 5:
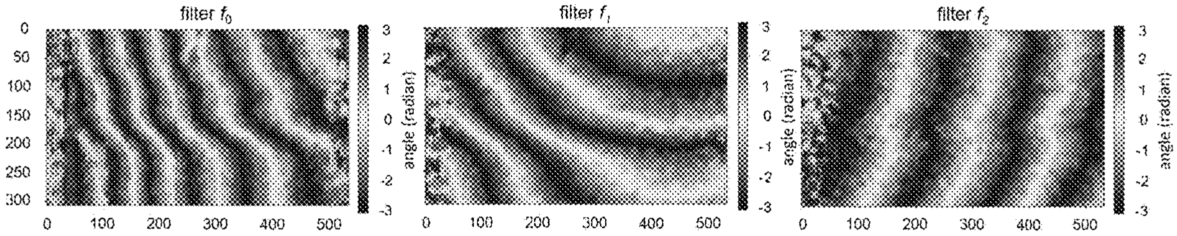
FIG. 5. Wrapped phase of the correlation between the image and the quadrature filter. The images correspond to the filters in the corrugation images 0, 1, 2 above. The phase is known modulo one “wave” and varies between −pi and +pi radians.
Figure 6:
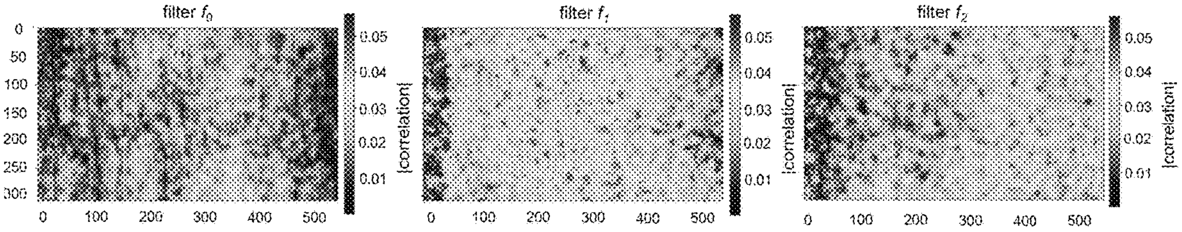
FIG. 6 The absolute value of the correlation between the image and the quadrature filter.
Figure 7A:
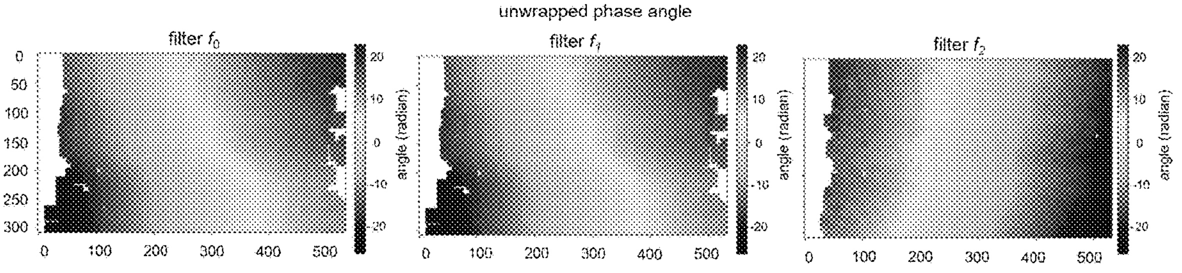
FIGS. 7A-7C.
Figure 7B:
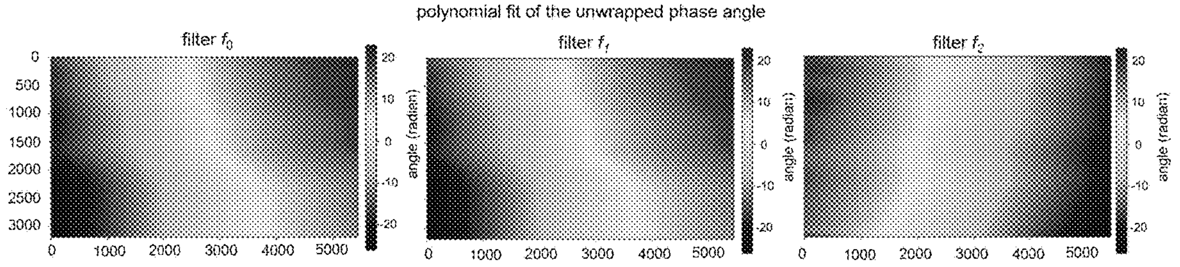
Figure 7C:
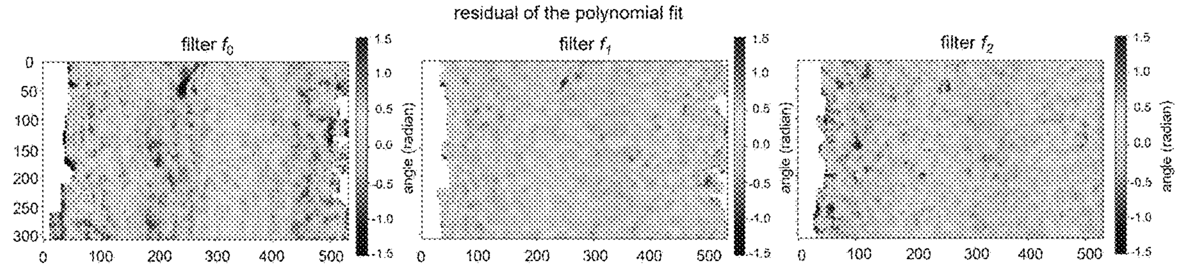
Figure 8:
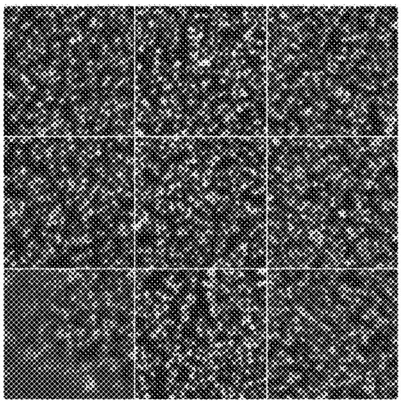
FIG. 8. Nine fragments of aligned images of the 155 cycles of sequencing.
Figure 9:
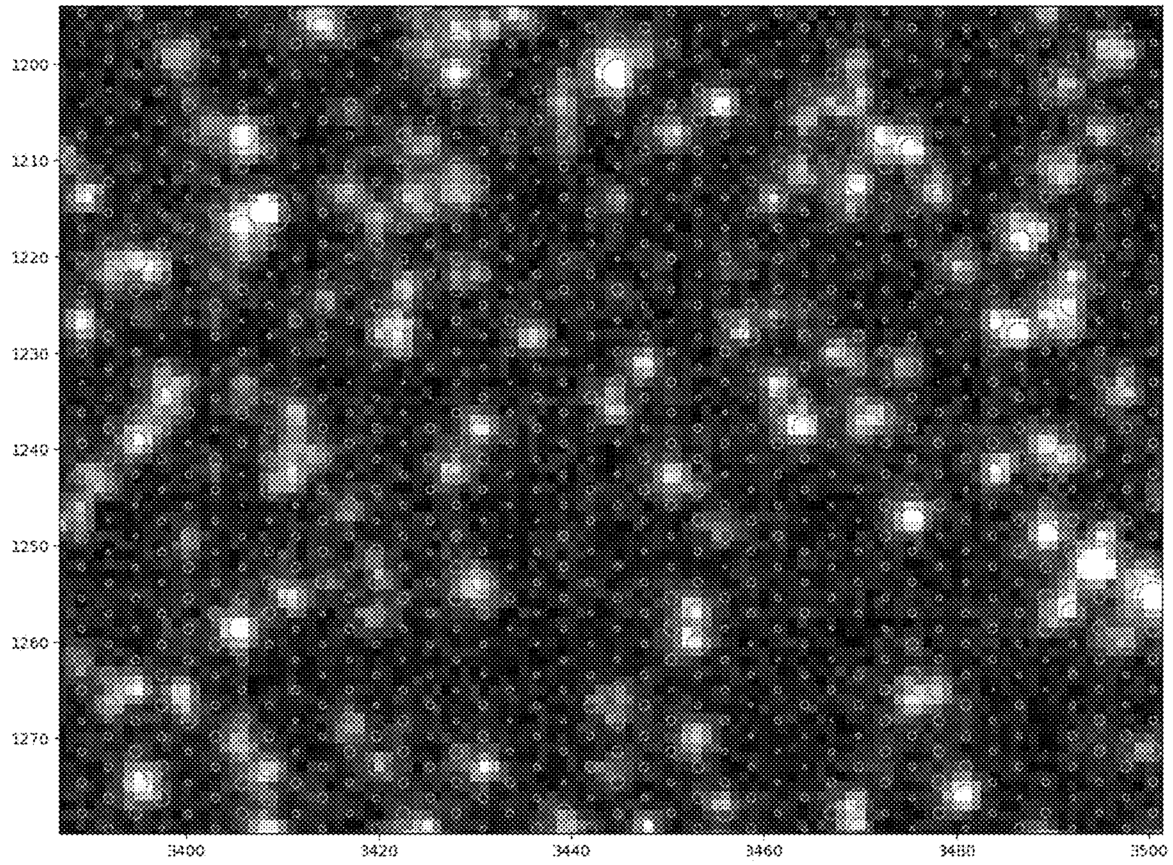
FIG. 9. Visualization of grid mapping and extraction. The centers of the open circles correspond to the grid locations, and the radii represent extracted intensities.

There are different options to define the signs and directions of the three frequency vectors. As an initial test, we choose the frequency vectors such that the vectors are separated by 120 degrees to ensure that at each feature location the three phases sum to zero (FIG. 3). A performance improvement can be realized by taking into account the nominal lowest order lens distortion, and creating the corrugation image that incorporates this expected distortion. This can be described by a single parameter $k_1$ and shared across all instruments of the same design. The center of distortion $x_c$ can be set to the nominal geometric center of the image. Further refinement is possible by calibrating $x_c$ and $k_1$ for each camera of each instrument. The corrugation image is analogous to the local oscillator at the nominal carrier frequency in heterodyne radio signal processing.

Correlate the input image with the quadrature filter to define a complex correlation image (CCI). We created a complex correlation image by computing correlations of the input with the quadrature filter for a number of overlapping square patches. In one implementation patches of 128×128 pixels were used with 10 pixel stride. A normalized complex correlation is computed for each patch from the image is the corresponding patch from the filter, producing one complex number of magnitude less or equal to 1: correlation=

$$\frac{\sum_{(x,y\in Q)} C^*(x, y)I(x, y)}{\sqrt{\sum_{(x,y\in Q)} (I(x, y))^2}},$$

where the summation is over the patch Q. If the stride is 10 pixels, the correlation image is 1/100th of the size of the original. The windowed normalized correlation can be efficiently computed using the integral image technique.

Compute the wrapped phase difference and the absolute value of the correlation to obtain a phase difference image. The function atan2(y, x) is defined as the angle in the Euclidean plane, given in radians, between the positive x axis and the ray from the origin to the point (x, y). The phase difference is obtained by taking the angle of the complex correlation atan2(Im(correlation, Re(correlation)), constituting the main piece of info extracted from the correlation. The phase difference thus computed is known modulo 2π. To compute the phase difference, only the numerator of the above expression is sufficient. The reason to compute a normalized correlation is that its absolute value of it is also useful as a metric of signal-to-noise, to help mask unreliable portions of the image (e.g. those outside of the fluidic lane or affected by fluorescent defects) from subsequent processing.

Using only two phases for subsequent analysis. The corrugation has three components, and by making use of all three correlation images we can take advantage of the redundancy between the three components. We can improve the estimate for the one of the three phases that has the lowest correlation magnitude associated with it, if the other two correlations are both significantly higher. Knowing that the three phases must add up to 0 everywhere, we replace a phase value with the negative sum of the other two if the corresponding correlation magnitude is below the inverse of the sum of the inverses of the other two correlations. This is a heuristic, based on a guess that the correlation is inversely related to the variance of the noise in the phase estimate.

Phase unwrapping. The phase difference image is passed to the 2D phase unwrapping routine. Areas with low absolute correlations are masked from unwrapping. Spuriously high correlations sometimes arise from noise, such as in the side areas that are outside of the lane and have no pattern. Such high correlation islands are typically small, disconnected from the lane, or connected to it via thin isthmuses. Binary morphological opening on the mask is performed to get rid of the improbable small high-correlation artifacts. Correlation values as low as 0.02 or slightly less are sufficient to produce good unwrapping results.

Regularization by fitting to a low-complexity surface such as a polynomial. The unwrapped phase will typically contain outlier pixels, especially at the boundaries. Real distortions are known to be smooth and limited to known low-spatial frequency bands. We enforce this by fitting the image to a Legendre polynomial. A Legendre polynomial with orders (4, 15) in x and y respectively works for the typical sections containing about 5,000×3,000 pixels. If the optical distortion is accounted for upfront in the corrugation, then a smaller order may be used in the horizontal dimension (2, 15), resulting in compute savings and better behaving fits at the boundaries. The fit is also weighted using the absolute values of the correlation as the weights.

Compute all grid locations with the correction for phase difference. We start from known locations $x=(x, y)^T$ the undistorted grid of the corrugation image:

$$2\pi f_0 \cdot x = 2\pi i$$

$$2\pi f_1 \cdot x = 2\pi j$$

where i and j are integer feature indices. If the static optical distortion is not taken into the account upfront, we find the distorted locations by iterating as follows:

$$x_0\colon x_c + [f_0 f_1]^{-T}\begin{bmatrix} i \\ j \end{bmatrix}$$

$$x_0\colon x_c + [f_0 f_1]^{-T}\left(\begin{bmatrix} i \\ j \end{bmatrix} - \frac{\Delta\phi(x_{l-1})}{2\pi}\right)$$

where l is the iteration index, the frequency vectors $f_0$ and $f_1$ are the nominal (i.e., prior frequencies), ϕ(x) is the two-component vector of phase differences corresponding to the frequencies $f_0$ and $f_1$ and evaluated at location x, and $x_c$ is the center of the image. The calculation is easily vectorized/parallelized across all features. The iterations terminate when the maximum difference between successive values of x over all features becomes smaller than some threshold equal to a small fraction of a pixel. In practice, about 3 or 4 iterations are typically needed for convergence.

If the static optical distortion is incorporated into the corrugation, then the iteration scheme is modified as follows:

$$x_0\colon x_c + \left(1 + k_1(x_{k-1} - x_c)^2\right)[f_0 f_1]^{-T}\left(\begin{bmatrix} i \\ j \end{bmatrix} - \frac{\Delta\phi(x_{l-1})}{2\pi}\right).$$

This expression is for to the scanning system where the optical distortion is 1-dimensional along x. Here $x_c=(x_c, y_c)^T$ is the center of distortion, which can be set to the center of the image.

Disambiguation of the grid indices. The steps above produce the subpixel coordinates for every grid feature in the image: x=x(i, j, channel, cycle). At this point the indices i, j are not yet coherent across channels and cycles. The indices are made coherent by using the image transforms obtained by any of the following: dense image alignment (ECC), sparse optical flow based alignment on focusing beads, or cycle-0 based alignment. The transforms do not have to be global, i.e. accurate over the entire image. A local transform accurate within a limited patch of the image is sufficient. A small number of anchor features are selected with the validity region of the transforms; the anchor feature coordinates are computed in all color channels in cycles according to the transforms, and then the closest grid features to those coordinates are the found in all of the grids x=x(i, j, channel, cycle). Offsets to i, j are then added such that each (i, j) pair point to the same physical feature in all colors and cycles. Several anchor features may be used as opposed to a single pair as a quality check. Successful grid mapping requires i, j offsets derived from all anchor features to agree.

Intensity extraction. Subpixel-accurate extraction of feature intensities is performed by multiplication with a collection of one or more filters. The filters implement least-squares optimal solution to the deconvolution of optical blurring and signal contributions from neighboring features. The construction of the filter collection and the extraction procedure is described elsewhere; see for example US Patent Application Publication 2021/0350533, which is incorporated herein by reference in its entirety. Briefly, the feature extraction analysis begins by building a model of the image incorporating the known feature locations and their unknown intensities and fitting the model to the actual image. This may result in generation of image-related data. The model of image formation is described by the linear system Bc=y, where c is the unknown vector of feature intensities, y is a column vector of all pixel intensities (the image flattened into 1D), and B is a matrix of size ($N_{pixels}$, $N_{features}$). Each row of B corresponds to a pixel and describes the contribution of each feature to that pixel. B is constructed using the knowledge of the feature locations, their model shape and the PSF. B is a very sparse matrix, because fluorescence from one feature only reaches a few pixels, or conversely, a pixel only sees significant contributions from perhaps seven nearest features at most. This is an overdetermined system, since there are more pixels than features, and allows for a least-squares fit solution.

As a sequencing run progresses, multiple images of the pattern with the same parameters (e.g., pitch, orientation angle, etc.) are taken over and over. The feature intensities and pixel intensities vary cycle-to-cycle (i.e., the feature and pixel intensities vary each sequencing cycle), but the underlying pattern is immutable. Therefore, only a relatively small number of matrices B is sufficient to describe image formation for a much larger total number of images from a run, or a plurality of runs. This permits realization of large computation time savings by reusing the matrices. Some or all versions of B describing the pattern and its possible phasing may be pre-computed, inverted, and stored in a database, indexed by the pattern parameters. When performing signal extraction on a particular image y, an appropriate inverse matrix, $B^+$ is formulated and used to extract the feature intensities via sparse matrix multiplication: $c=B^+y$. In embodiments, the matrices B+ are not used directly to the images. Instead, they are used to construct a bank of convolution filters. The filters, when applied to the images, produce equivalent results to the matrix multiplication described above. Significant memory and compute savings are realized, while preserving sub-pixel accuracy. Another benefit is code simplification.

The pattern may be a regular hexagonal grid with known nominal pitch and orientation angle. The pattern pitch and angle may have deviations from the nominal; e.g., <2% deviation is expected for the pitch to account for the variability in the imaging optics magnification. The pattern pitch and angle may also vary across the image due to the distortion of the optics. For example, less than about 1% distortion is expected. In embodiments, the pattern is ordered in a lattice, e.g., a hexagonal lattice or Bravais lattice. In embodiments, the pattern is ordered in a cubic, hexagonal, rhombohedral, tetragonal, orthorhombic, monoclinic, or a triclinic lattice. Alternatively, in embodiments, the pattern may be a random pattern (i.e., a non-hexagonal grid). Note, the ordered pattern or ordered array (e.g., an ordered lattice) does not necessarily need to be rectilinear (e.g., an x-y format of features that are in rows and columns), so long as the feature pattern and corresponding interstitial regions is known. In embodiments, fluorescent features are assumed to be located on the hexagonal grid and are assumed to be similar in size and shape.

The image analysis may use the following inputs, which are non-limiting examples: a set of four-channel (i.e., four-color) images corresponding to sequencing cycles of one tile; a four-channel image of focusing beads (if present); a configuration file describing the pattern parameters (e.g., nominal pitch and orientation of the pattern, the pixel pitch, etc.); and optionally, a file of pre-computed extraction matrices. In embodiments, the image analysis includes a set of four-channel (i.e., four-color) images corresponding to sequencing cycles of one tile as an input. In embodiments, the image analysis includes a four-channel image of focusing beads (if present) as an input. In embodiments, the image analysis includes a configuration file describing the pattern parameters (e.g., nominal pitch and orientation of the pattern, the pixel pitch, etc.) as an input. In embodiments, the image analysis includes a file of pre-computed extraction matrices as an input. The image analysis process can output, for example, a single file (e.g., an HDF5 file) per cycle listing for every feature detected, including feature center coordinates in image pixels; a feature index; extracted signal levels (i.e., intensity values); and a single file per cycle with extracted intensities. The image analysis process can output, for example, a one or more files in a suitable format that includes information for every feature detected, including feature center coordinates in image pixels; a feature index; extracted signal levels (i.e., intensity values). In embodiments, the image analysis process provides a single electronic computer-readable data file per cycle with extracted intensities.

EXAMPLES

Image distortions across cycles, scan time delay, cameras and individual color channels. The methods described herein enables rapid feature detection and accounts for transient distortions of the image that may be different in every cycle, and also vary across the color channels. The sets of feature coordinates output by the method for different cycles and colors are related by more general deformation transformations than the affine transforms that have been employed previously.

Chromatic aberration correction. In an example embodiment, a sequencing instrument has a detection apparatus that can include at least two cameras (referred to herein as camera A and camera B), each capable of imaging two different color channels, for example, coinciding with different labels used to distinguish one nucleotide base type from another are particularly applicable. Camera A collects images of fluorescent channels 2 and 3, and camera B collects channels 1 and 4. Channels that are imaged by the same cameras have different spectral wavelengths, and the optics have some lateral chromatic aberration. Previously described in US 2021/0350533, which is incorporated herein, a chromatic correction may be performed in order to associate the feature images in the channels of the same camera, e.g. 1 and 4 of camera B. The effect is particularly large, on the order of 1 pixel, for camera B, whose two channels are at the extreme ends of the fluorescence spectrum. The correction takes the form of a coordinate transform. An affine transform, i.e. a linear transform allowing for rotation, scale, shear and translation, was found to adequately describe the chromatic shift between channels of the same camera. The transform is different for different instances of the instrumental hardware. The transform is calculated automatically from the maximum intensity projection (max-projection) of the sequencing images of the first few (such as 5-20) cycles. The max-projection is then constructed based on the sequencing images warped such that channel 1 aligns to the channel 1 of the alt image, and channel 2 aligns to the channel 2 of the alt image. The same warp applied to channel 4 as that for channel 1, which is on the same camera. Likewise the warp of channel 2 is applied to channel 3. With the images warped in this way, the max projection is built up for each of the four channels. The channel 4 of the max projection is then aligned to the channel 1 of the max projection to obtain the chromatic correction affine transform for camera B.

Likewise the channel 3 of the max projection is then aligned to the channel 2 to obtain the chromatic correction affine transform for camera A. A direct (as opposed to feature-based) image alignment method is used to find the affine transform. Concretely, FindTransformECC from the OpenCV library with the affine motion model is applied to the entire image, with the exception of a small border region. The intra-camera chromatic shifts are assumed to be stable over the course of the run. They may be stored and used for coordinate transforms in subsequent processing.

One way to visualize the detected deformations is to compare the coordinates of the same set of features across colors and across cycles and to plot the relative displacements as vector fields. A small set of features were selected such they are located approximately on a 163×163 pixel grid, which results in acceptable data density for visualization. The choice of 163 pixels in the scan direction is advantageous because it corresponds to the effective distance between the red- and green-illuminated array's camera.

The feature coordinates were averaged over all 155 cycles, and then this average was subtracted from the corresponding coordinates in a particular cycle, resulting in displacements relative to the average cycle:

$$\Delta x(i, j, \text{cycle}, \text{channel}) = x(i, j, \text{cycle}, \text{channel}) - \frac{1}{N_{cycles}} \sum_{all\ cycles} x(i, j, \text{cycle}, \text{channel})$$

The resulting vector field is dominated by the bulk translation of low single pixels in size. The translation is likely due to the uncertainty of stage scan start timing and thermal drifts over time; it is uniform over the image and as such does not present any problem to this or earlier algorithms. We remove the bulk translation to highlight the non-uniform deformations. For example, one approach to remove the translation is to subtract the component of displacement common to all features and color channels:

$$\Delta x(i, j, \text{cycle}, \text{channel}) - \frac{1}{4N_{cycles}} \sum_{\substack{all\ i,j \\ all\ channels}} \Delta x(i, j, \text{cycle}, \text{channel})$$

Figure 10:
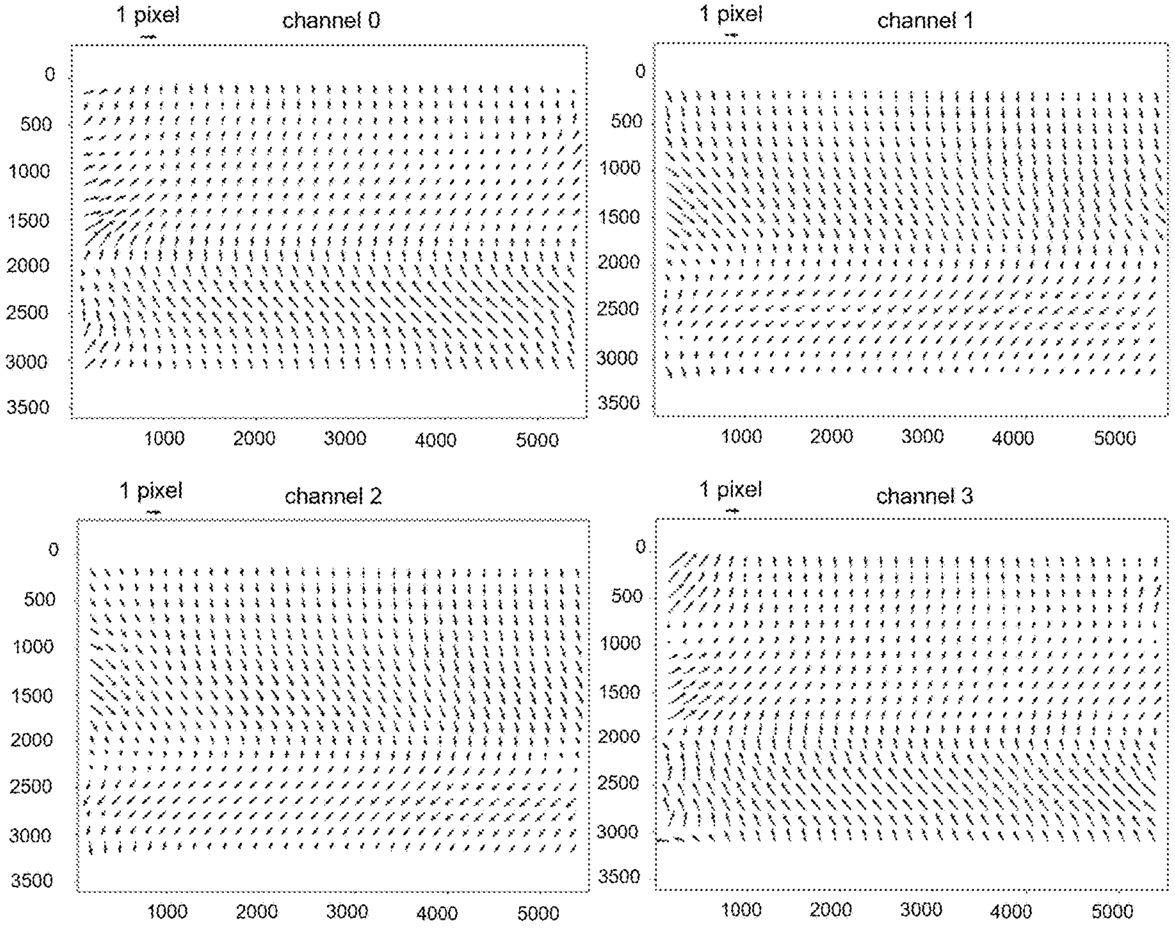
FIG. 10. Displacements of selected features, for four color channels. The axes correspond to the pixel coordinates of the features in the original image. The displacement vectors are on a different scale; the arrow at the top of each plot shows the scale for 1 pixel worth of displacement. Channel numbers are 0-based. Channels 0 and 3 are from camera B and channels 1 and 2 are from camera A. Channels 0 and 1 result from green illumination. Common-mode displacement has been subtracted.

This quantity is plotted in the FIG. 10. By its definition, the sum of all the vectors in all four plots together is zero. The most noticeable feature of these plots is the net vertical movement, upwards for a first camera and downwards for a second camera, with a net shift of between the two of about 1 to 2 pixels. It is conceivable that the cameras were physically offset like this during this scan relative to the "average" scan. Alternatively, this apparent vertical shift between cameras is due to the difference in the synchronization of the scans of two cameras. Again, a bulk translation like this does not present a problem per se, but in this case it obscures the deformations.

Another approach to remove the translation is to subtract the common displacements on a channel-by-channel basis:

$$\Delta x(i, j, \text{cycle}, \text{channel}) - \frac{1}{N_{features}} \sum\nolimits_{all\ i,j} x(i, j, \text{cycle}, \text{channel}).$$

Figure 11:
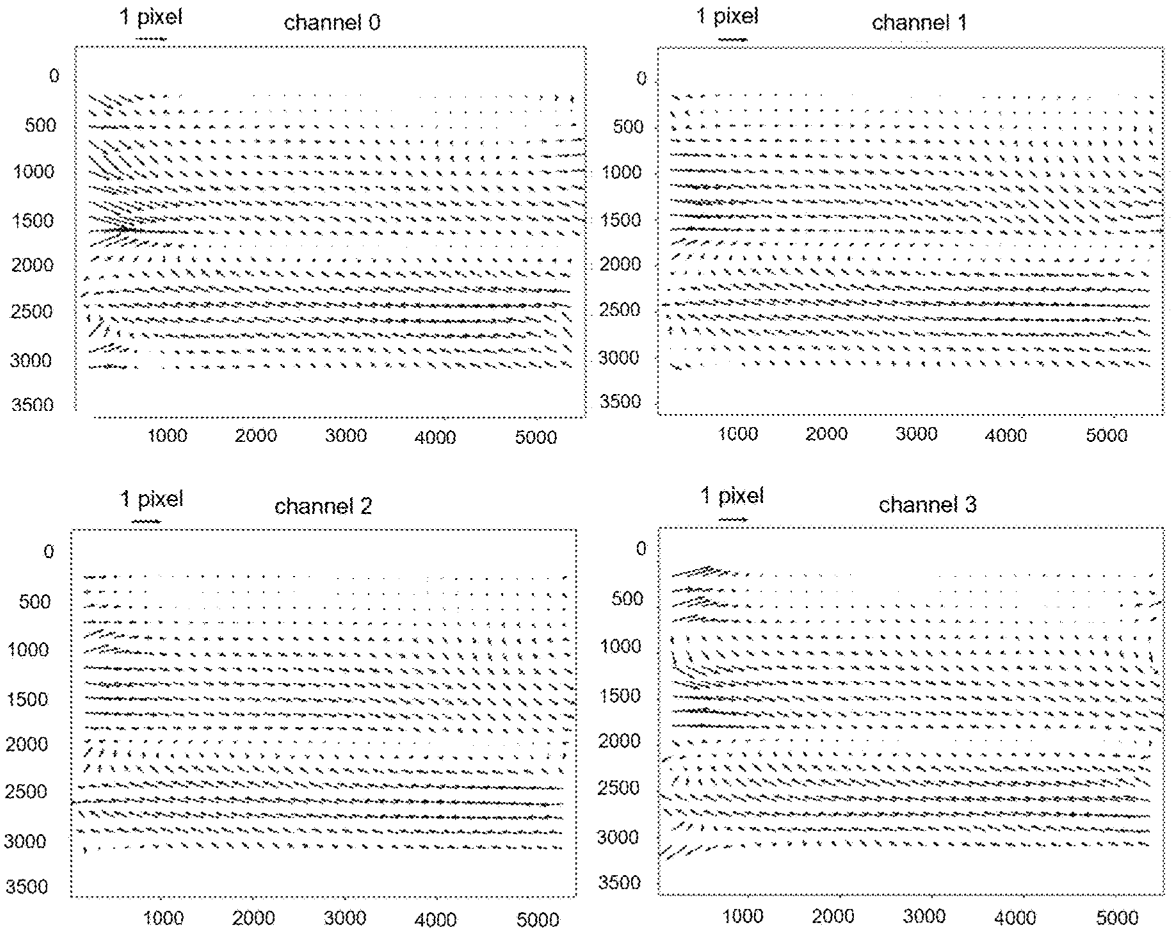
FIG. 11. Displacements of selected features, for four color channels. Displacements common to each channel have been subtracted.

This has the effect that the vectors in each plot individually sum up to zero, as seen in FIG. 11.

The vectors on extreme left of FIG. 11 are larger and noisier; this is the area where the original image had no actual features and the phase fit was an extrapolation rather than interpolation. The area of the plots that is actually supported by the feature grid in the image shows a pattern that is quite coherent across space and across color channels. The scan coordinate is vertical, this is the time axis, and the coordinate is increasing in chronological order. The vector field of each channel is largely the same horizontally, i.e. at the same moment in time. This particular example shows fairly large side-to-side motion of up to ½ pixel magnitude. The pairs of images resulting from illumination by the same color are highly correlated, even though those are taken by different cameras. Comparing channels from the same camera, e.g. channel 1 and channel 2 from a first camera, it is clear that those are highly correlated too, with a lag that could plausibly be about one row of arrows, which corresponds to 163 pixels. The direction of the lag indicates that for this scan the one illumination line was leading the second line.

Aggregation of results across the image, across channels, and across cycles. After the extraction has been applied to every color channel image, the resulting intensity arrays c are concatenated into one array for the entire image. Besides the intensities, auxiliary data items are also concatenated in similar-sized array. For example, these items include: feature x and y coordinates, integer indices i and j. All these data items are assembled into a 2D array, where every row corresponds to a feature.

Output of extracted signals. The array with the extracted intensities, coordinates and indices is written to a file on a non-volatile storage medium, e.g. a HDF5 file on a hard disk; one file per tile per cycle. The configuration settings may also be saved in the same file. Alternatively, the array residing in RAM may be directly passed onto the next stage in the processing pipeline, e.g. to a basecaller, without writing it to non-volatile storage.

Focusing beads may be located randomly, i.e., not adhering to the pattern grid, and may therefore be a source of noise for the pattern detection algorithm. Occasionally, the focusing beads are brighter than cluster. In order to improve the signal-to-noise ratio (SNR) of the pattern, the focusing bead images are altered before running pattern detection. The focusing beads detected in the altered image (referred to as an alt image), and a binary map of their location is stored.

For each of the sequencing images, the map is aligned to the image, and the pixels belonging to the focusing beads are "in-painted", i.e. focusing beads are erased and their pixels are filled with values interpolated from their immediate surroundings.

Example Computer System

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

With certain aspects, to provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), the Internet, WiFi (IEEE 802.11 standards), NFC, BLUETOOTH, ZIGBEE, and the like.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed:

1. A method of quantifying features in a repeating pattern of an object, the method comprising:

obtaining a plurality of images of the object using a detection apparatus, wherein the plurality of images includes a repeating pattern of features having different signal levels;

providing the images or image-related data to a computer, wherein the computer has parameter data that describe the repeating pattern of features;

partitioning the image or the image-related data into a plurality of registration subimages on the computer;

detecting on the computer the repeating pattern of features for each registration subimage, the detecting based on a correlation between at least an image of the plurality of images and a corrugation image, wherein the corrugation image is determined from the parameter data;

assigning an index address for each feature of the repeating pattern of features, the assigning based on the correlation; and quantifying a signal level of each feature.

2. The method of claim 1, wherein the signals are fluorescent intensities.

3. The method of claim 1, further comprising providing the object, wherein the object has a repeating pattern of features in a two-dimensional plane.

4. The method of claim 3, wherein the object is or relates to genomic fragments immobilized on an array.

5. The method of claim 1, wherein the detection apparatus includes at least one camera.

6. The method of claim 1, wherein the parameter data relates to at least one of a grid orientation angle, an apparent pitch in pixel units, and a phase of a feature grid at a fixed pixel location of the image.

7. The method of claim 1, wherein quantifying the signal level of each feature comprises building a model of the subimage incorporating known feature locations and corresponding unknown intensities and fitting the model to the image of the object.

8. The method of claim 7 wherein the model of the subimage comprises a matrix that is pre-computed and stored in computer memory or a computer-readable medium.

9. The method of claim 8, wherein the matrix is reused for a different subimage.

10. The method of claim 1, wherein each index address is a unique address.

11. The method of claim 10, wherein each unique address is an integer vector of length 2.

12. The method of claim 1, further comprising performing a chromatic correction of the image or image-related data.

13. The method of claim 1, wherein the detection apparatus comprises at least two cameras including a first camera and a second camera and wherein each of the first camera and the second camera is configured to obtain an image of two different color channels.

14. The method of claim 13, wherein each color channel coincides with a different label used to distinguish one nucleotide base type from another nucleotide base type.

15. The method of claim 13, wherein the first camera collects an image of first and second fluorescent channels and the second camera collects an image of third and fourth fluorescent channels.

16. The method of claim 15, further comprising performing a chromatic correction in order to associate feature images in the channels of a common camera.

17. A non-transitory computer-readable medium containing instructions to configure a processor to perform operations comprising:

obtaining an image of an object using a detection apparatus, wherein the image includes a repeating pattern of features having different signal levels;

providing the image or image-related data to a computer, wherein the computer has parameter data that describe the repeating pattern of features;

partitioning the image or the image-related data into a plurality of registration subimages on the computer;

detecting on the computer the repeating pattern of features for each registration subimage, the detecting based on a correlation between at least an image of the plurality of images and a corrugation image, wherein the corrugation image is determined from the parameter data;

assigning an index address for each feature of the repeating pattern of features, the assigning based on the correlation;

matching the index address for each feature on the computer; and quantifying a signal level of each feature.

18. A system comprising:

a processor; and a memory, wherein the processor and the memory are configured to perform operations comprising:

obtaining a camera image of an object using a detection apparatus, wherein the camera image includes a repeating pattern of features having different signal levels;

providing the camera image or image-related data to a computer, wherein the computer has parameter data that describe the repeating pattern of features;

partitioning the camera image or the image-related data into a plurality of registration subimages on the computer;

detecting on the computer the repeating pattern of features for each registration subimage, the detecting based on a correlation between at least an image of the plurality of images and a corrugation image, wherein the corrugation image is determined from the parameter data;

assigning an index address for each feature of the repeating pattern of features, the assigning based on the correlation;

matching the index address for each feature on the computer; and quantifying a signal level of each feature.

19. The system of claim 18, the operations further comprising:

forming the corrugation image having substantially same dimensions as the camera image, the corrugation image related to three spatial frequencies.

20. The system of claim 19, wherein the three spatial frequencies describe a hex pattern.

21. The system of claim 19, wherein the three spatial frequencies relate to vectors each separated by 120 degrees.

22. The system of claim 19, further comprising correlating the camera image with the corrugation image to define a complex correlation image.

23. The system of claim 22, further comprising calculating a wrapped phase difference to a phase difference image.

24. The system of claim 23, further comprising unwrapping the phase difference image.

25. The system of claim 24, wherein areas having low correlation are not unmasked.

26. The system of claim 24, further comprising fitting the phase difference image to a polynomial.

27. The system of claim 26, wherein the polynomial is a Legendre polynomial.

28. The system of claim 27, further comprising computing grid locations that correspond to features in the phase difference image.

29. The system of claim 28, further comprising deconvoluting optical blurring of the image.

* * * * *